United States Patent Office 3,787,557
Patented Jan. 22, 1974

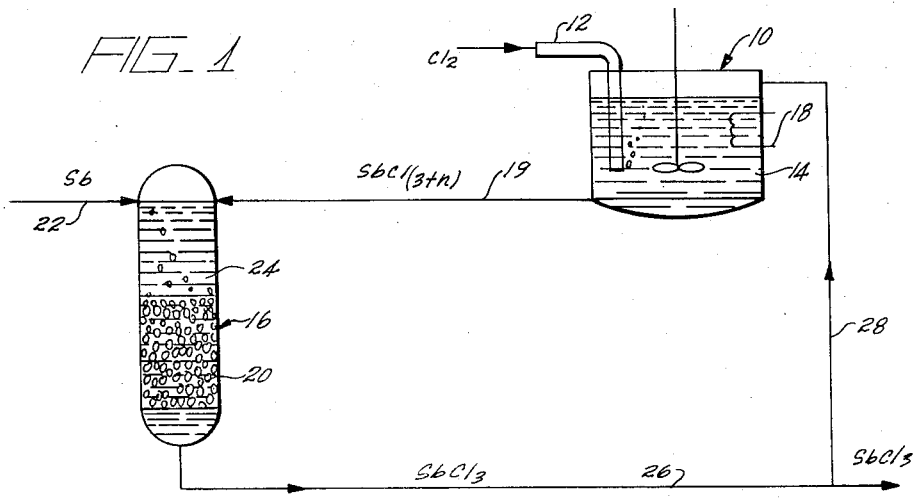
FIG_1
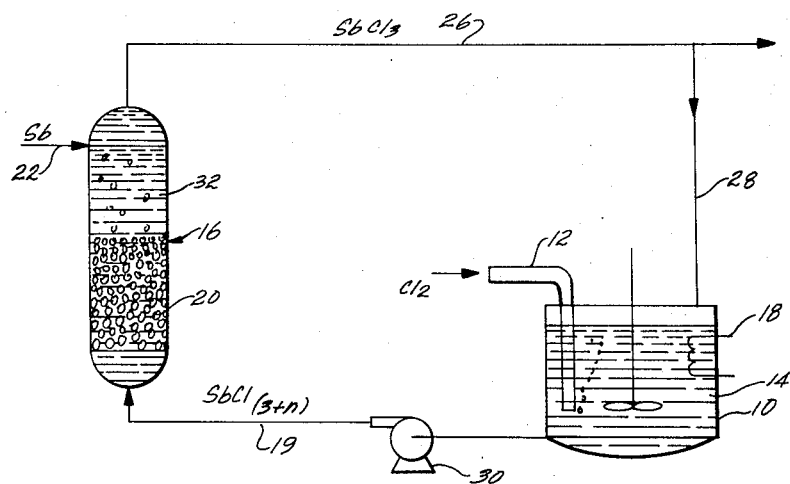
FIG_2

---

3,787,557
PROCESS FOR MANUFACTURING OF ANTIMONY TRICHLORIDE
Robert D. Stewart, La Habra, Calif., assignor to Occidental Petroleum Corporation, Los Angeles, Calif.
Continuation-in-part of abandoned application Ser. No. 179,827, Sept. 13, 1971. This application Apr. 16, 1973, Ser. No. 351,372
Int. Cl. C01b 29/00
U.S. Cl. 423—87
12 Claims

ABSTRACT OF THE DISCLOSURE

There is provided a two-stage process for the production of antimony trichloride from antimony. First, antimony trichloride is reacted with chlorine to form antimony pentachloride in a first reaction zone. Particulate antimony metal and the antimony pentachloride formed in the first reaction zone are then reacted in a second reaction zone to form antimony trichloride. A portion of the antimony trichloride formed is collected as product and the balance recycled for conversion to antimony pentachloride.

BACKGROUND OF THE INVENTION

This is a continuation-in-part of my application Ser. No. 179,827, filed Sept. 13, 1971, now abandoned.

The present invention relates to the production of antimony trichloride from antimony metal.

Prior methods for production of antimony trichloride from antimony metal have involved direct reaction of the antimony metal with chlorine to form antimony trichloride.

In U.S. Pat. 1,384,918, incorporated herein by reference, there is taught a process whereby antimony metal is submerged beneath the bath of molten anhydrous antimony trichloride and chlorine introduced into reactive contact with the antimony metal at a rate sufficient to maintain, through the exothermic heat of reaction, the temperature of the system at a desired level. This temperature may be selected to effect continuous distillation of antimony trichloride at its boiling point of about 220° C. or, on the other hand, for recovery of the antimony trichloride as a melt above its melting point.

U.S. Pat. 3,367,736 to Sopchak pertains to a similar process in which antimony metal is reacted with gaseous chlorine at a temperature of from 90°–215° C. in an agitated suspension of antimony metal particles in liquid antimony trichloride while maintaining the antimony metal content of the reaction system in the range of 20–65 percent by weight based on the total weight of the reaction system.

I have observed that when antimony trichloride is prepared by the direct reaction of antimony metal with chlorine by the general reaction:

$$2Sb + 3Cl_2 \rightarrow 2SbCl_3 \qquad (1)$$

in a single stage reaction, a product containing excess chlorine in the form of the higher antimony chloride, $SbCl_5$ is formed when chlorine is added in excess of that required by Equation 1. This higher chloride may be identified by the oxidizing power of excess chlorine above that present in antimony trichloride.

The excess chlorine is coupled by the antimony trichloride and is undesired in the product for several reasons.

Since the desired product is antimony trichloride any excess chlorine is an undesirable impurity which reduces the product quality from both toxicity and corrosion standpoints. In addition, a product retaining excess chlorine as coupled by antimony trichloride is uneconomical in that it represents a waste of chlorine over that required for the preparation of the desired product, namely antimony trichloride.

SUMMARY OF THE INVENTION

There is provided a two-stage process for the conversion of antimony metal to high purity antimony trichloride.

The process, in general, comprises reacting antimony trichloride with gaseous chlorine in a first reaction zone to form the higher chlorides of antimony which are compounds represented by the general reaction:

$$SbCl_3 + \frac{n}{2} Cl_2 \longrightarrow SbCl_{(3+n)} \qquad (2)$$

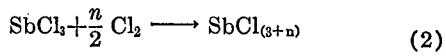

wherein $n$ has a value from about 1.5 to about 2.2 and preferably from about 1.7 to about 2.1. If a stoichiometric amount of chlorine is used, the product formed will be principally antimony pentachloride.

The higher chlorides of antimony formed as a consequence of reaction (2) above are then passed to a second reaction zone, preferably a column containing particulate antimony metal, where the product of the first reaction zone reacts with antimony by the general reaction:

$$3SbCl_{(3+n)} + nSb \rightarrow (3+n)SbCl_3 \qquad (3)$$

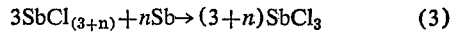

with the reaction (3) involving the reaction of antimony pentachloride with antimony when $n$ equals 2.

The antimony trichloride formed as a consequence of the practice of this invention is of extremely high purity. By the term "high purity" there is meant that $n$ in the expression $SbCl_{(3+n)}$ is or approaches zero and the product can be characterized as being essentially free of the higher chlorides of antimony, namely antimony pentachloride.

Other impurities such as iron and lead which may be present in the antimony metal as natural impurities may not be separated and may be carried along in their chloride state as part of the product although some purification as to them may also be accomplished. Thus, by carrying out the reaction in two separate reaction zones, using two separate reactors, each reaction zone can be independently controlled to favor the reaction to be carried out in each reaction zone and also permit coordination of the reactions in each of the reaction zones to assure that essentially no excess chlorine is associated with antimony in the product.

In the practice of the process of this invention, reaction (2) is generally carried out at a temperature above the melting point of antimony trichloride in the reaction mass to about 200° C., preferably, from about 73° C. to about 150° C.

The temperature ranges given for both reactions are based on operations at or close to atmospheric pressures and may vary depending upon the pressure employed with the upper operating temperature increasing as pressure increased and decreased as pressure is reduced.

THE DRAWINGS

FIG. 1 is an illustration of one process for carrying out the practice of this invention and involves co-current feed of antimony and antimony pentachloride to a reactor.

FIG. 2 is a modification of the process illustrated in FIG. 1 and shows countercurrent feed of antimony metal to the reactor relative to the feed of antimony pentachloride.

DESCRIPTION

According to the present invention there is provided a two-step process for the preparation of antimony trichloride from antimony metal.

The first step of the process of this invention involves, in general, the reaction in the liquid phase of antimony trichloride with gaseous chlorine to form antimony pentachloride or a mixture of the higher chlorides of antimony.

As used herein the term "higher chlorides of antimony" is meant compounds having the empirical formula:

$$SbCl_{(3+n)} \qquad (4)$$

wherein $n$ has a value of from 1.5 to 2.2, preferably, from 1.7 to about 2.1 and includes antimony pentachloride.

The general reaction carried out at this stage of the process is $$SbCl_3 + \frac{n}{2} Cl_2 \longrightarrow SbCl_{(3+n)} \qquad (2)$$

wherein $n$ is as defined above, and where antimony pentachloride will be the primary product if the reaction is carried out at or close to stoichiometric conditions.

The reaction is carried out in the substantial absence of moisture and above the melting point of antimony trichloride in the system to about 200° C., where the reaction slows because of dissociation of the higher chlorides of antimony into antimony trichloride and chlorine. Preferably, the reactions are carried out at a temperature from about 73° C. to about 150° C.

The second step of the process is to react the higher chlorides of antimony formed in the first stage or reaction zone with antimony metal in a second stage or reaction zone where there is formed antimony trichloride by the general reaction (3) above.

The reaction may be carried out under the same conditions for the first stage of the process of this invention. The rates of reaction, however, is slower. Accordingly the temperatures employed in the first and second reaction zones are adjusted such that the output of the first reaction zones meets the feed requirements of the second reaction zone at the temperature employed therein.

The reaction is preferably carried out in a reactor containing a column of particulate antimony metal with cocurrent or countercurrent feed of the higher chlorides of antimony to the reactor which respect to the feed of antimony metal.

The size of the antimony metal employed for conversion to antimony trichloride may be varied widely. However, the preferred size ranges are less than about 4 mesh and greater than about 20 mesh with lower sizes being preferred to enhance rate of reaction.

The reaction is carried out by the contact of a liquid with a solid to form a liquid product, namely, antimony trichloride and the reaction zone must be maintained above the solidification point of antimony trichloride, namely, about 73° C.

As indicated, the product formed is antimony trichloride. A portion of the product is collected for sale and the balance recycled for the formation of the higher chlorides of antimony for reaction with antimony metal.

With reference now to FIG. 1, there is shown one scheme for carrying out the two-step process of this invention. With reference thereto, first stage of the reaction is carried out in reactor 10 wherein gaseous chlorine entering tube 12 is bubbled through liquid phase 14 containing antimony trichloride to convert the antimony trichloride to the higher chlorides of antimony as set forth above.

The reaction is rapid and exothermic and when balanced against the feed requirements for reaction vessel 16 the heat generated in reaction zone 10 is approximately 28.7 percent of the total heat of reaction required to form a mole of antimony trichloride from antimony metal. The temperature of the reaction may be controlled by the rate of feed of chlorine through 12 alone, or in combination with external cooling or internal cooling through the use of cooling coil 18.

Because the reaction in vessel 10 is rapid and maintained at a temperature where no solids are present and the amount of heat released is relatively small, reactor 10 may be small in size relative to reactor 16.

As previously indicated, the products formed in the reactor have the empirical structure $SbCl_{(3+n)}$ wherein $n$ has the values defined above. When $n$ has a value below about 1.5 inefficient utilization of the reactor volume occurs, while at values above 2.1 chlorine absorption becomes slow and chlorine may be lost from the reaction system representing a poor operating economy. In general, the reaction is carried out at a temperature from the solubility temperature of antimony trichloride in melt 14 to about 200° C., preferably from about 70° C. to about 150° C. with the higher values of $n$ being achieved at lower temperatures because of the dissociation of antimony pentachloride at temperatures above about 200° C. The liquid chlorides of antimony including, as indicated, antimony pentachloride are then fed by line 19 to column 16 where they are brought into contact with a bed 20 of antimony metal and percolate downward through the bed reacting with the antimony metal to form the liquid antimony trichloride which is collected at the base of the bed.

Antimony requirements of the bed may be fed at any point along the length of reactor 16 although it is shown to be fed to the top of the reactor at point 22 for immediate contact with the higher chlorides of antimony fed to the reactor through line 19.

Reactor 16 must always be maintained above about 70° C. and preferably from 70° to 200° C., more preferably from 73° C. to 150° C. As indicated, the reaction in reactor 10 in contrast may be carried out at temperatures below 73° C. so long as the precipitate of antimony trichloride is not formed since the higher chlorides of antimony have melting points well below antimony trichloride and the solution formed may remain as a stable liquid without the formation of a precipitate depending upon the composition of the liquid in melt 14 of reactor 10. This is important as it eliminates the formation of precipitates on cooling surfaces and fluid transfer lines.

As previously indicated, there is formed above the bed of antimony metal 20 a liquid reservoir 24 containing the higher chlorides of antimony which percolate downward through the antimony metal to form antimony trichloride which is carried from the reactor by line 26.

A portion of the product is recovered and the balance recycled along line 18 to make up fresh reactant for reactor 10.

Where overall reactions are carried to maintain an equilibrium between rate of generation of the higher chlorides of antimony and the rate of conversion of antimony to antimony trichloride in reactor 16, approximately 71.3 percent of the total heat required to convert a mole of antimony to antimony trichloride is generated in reactor 16. Splitting the heat between the reaction zones materially aids in maintaining the reactions at the desired temperatures.

Some jacketed cooling, however, may be required to control the reaction temperature within reactor 16. Of the antimony trichloride formed in reactor 16, approximately 60 percent is recycled to reactor 10 for conversion to the higher chlorides of antimony to meet the needs of reactor 16.

The balance collected as product may be cast into cakes passed over chilled rolls to form flaked antimony trichloride distilled to further increase its purity or converted to the oxides of antimony.

All piping or conduits used in the system where antimony chloride is present must be maintained at or above 73° C. to prevent solidification of the antimony trichloride.

The degree of conversion of antimony metal to antimony trichloride per unit of volume of feed will depend, in part, on the residence time of the higher chlorides of antimony in reactor 16. Generally, a contact time of the higher chlorides with antimony metal of from about 0.25 to about 2 hours is employed.

With reference now to FIG. 2, there is illustrated a similar operation in which the flow of the higher chlorides of antimony are countercurrent to the feed of antimony. With reference thereto, the higher chlorides of antimony are pumped by pump 30 through bed 20 of antimony metal for reaction with the antimony metal, and there is formed a liquid phase 32 at the top of reactor 12 of antimony trichloride which is drawn off from the top of the reactor by line 16 and split in the manner set forth above.

While it is normally preferred to carry out the reaction using a fairly quiescent bed of antimony metal, the scheme shown in FIG. 2 may be operated under conditions where higher chlorides of antimony are fed to reactor 16 at a rate sufficient to cause some degree of fluidization.

This, however, will generally require the use of a longer reactor in order to achieve conversion without carryover of unconverted higher chloides of antimony with the antimony trichloride.

The following are examples of the practice of the process of this invention.

EXAMPLE 1

Antimony trichloride was reacted with chlorine gas in a reactor maintained at a temperature between 80° C. and 100° C. to form antimony pentachloride. Analysis of the product showed it to contain 5 mol percent excess chlorine and to have empirical formula: $SbCl_{(5.05)}$. 27.28 parts by weight of the liquid product obtained was introduced into a tubular reactor having length to diameter ratio of 50. The reactor contained 36.16 parts by weight of —4 mesh antimony metal which occupied 25 percent of the height of the tubular reactor. A vigorous exothermic reaction took place as the antimony pentachloride $SbCl_{(5.05)}$ contacted the antimony metal. The flow of liquid, both reactant and product, through the reactor was controlled to provide a mean contact time of the antimony chlorides with the antimony metal of approximately 15 mins. A total of 33.42 parts by weight of product was collected which was 96 percent of the amount of the $SbCl_3$ theoretically available from the amount of antimony pentachloride added. Analysis of the resultant product showed it to contain a 4 mol percent excess chlorine and to have the empirical formula $SbCl_{(3.04)}$.

EXAMPLE 2

44.55 parts by weight of an antimony chloride prepared by the reaction of antimony trichloride and chlorine in a liquid phase and have an empirical formula of $SbCl_{(4.59)}$ was introduced into the tubular reactor used in Example 1, the reactor containing 55.27 parts by weight of —4 mesh antimony metal, the antimony metal initially constituting 42 percent of the height of the reactor. The output of the reactor was initially closed until an initial vigorous reaction had subsided. The reactor output was then opened and the liquid product allowed to drain over a 30 minute period during which the reactor was heated to maintain the product in a liquid state. A total of 53.61 parts by weight of the liquid product was obtained which represented a 98 percent recovery of the theoretical amount of antimony trichloride recoverable. Analysis showed the product to have empirical composition $SbCl_{(3.006)}$. The product thus consisted of 99.6 weight percent $SbCl_3$ and only 0.4 weight percent $SbCl_5$.

EXAMPLE 3

One hundred parts by weight of —4 mesh antimony metal is introduced into a vertical tubular reactor having a length to diameter ratio of 25. The bottom of the reactor consists of a porous support plate below which is an inlet tube for introduction of antimony pentachloride. The reactor is provided with an outlet tube located 20 reactor diameters above the support plate. The antimony metal occupies 75% of the reactor length between the support plate and the top outlet tube. The reactor is provided with a jacketed heater to maintain the product in a liquid state.

A total of 500 parts by weight of antimony pentachloride as prepared in Example 1 and having an empirical formula $SbCl_{(4.99)}$ is introduced into the bottom inlet tube of the reactor at a rate of 1.75 parts by weight per minute. Simultaneously, 136 parts by weight of antimony metal of —4 mesh size is introduced into the top of the reactor at a rate of 0.475 part by weight per minute. A vigorous exothermic reaction takes place between the antimony pentachloride and the antimony metal at the bottom of the reactor. The reaction becomes less vigorous as the liquid proceeds upward through the reactor. The antimony trichloride product overflows through the top outlet tube where it is collected and allowed to solidify.

Continuous addition of the antimony metal into the top of the reactor maintains the height of the antimony column essentially constant and the contact time between the antimony chlorides and the metal at approximately 30 minutes.

At the end of the reaction, 548 parts by weight of product is collected from the product overflow and 80 parts by weight of product is obtained by draining the column. This is 99% of the amount of $SbCl_3$ theoretically available from the amount of antimony pentachloride introduced into the reactor. Analysis of the product shows it to contain less than 0.1 mole percent excess chlorine.

What is claimed is:

1. A process for the production of antimony trichloride of high purity from antimony metal which comprises:
    (a) reacting antimony trichloride with gaseous chlorine in the substantial absence of moisture in a liquid phase in a first reaction zone to form the higher chlorides of antimony having the empirical formula $SbCl_{(3+n)}$ when $n$ has a value of from about 1.5 to about 2.2;
    (b) contacting the liquid, higher chlorides of antimony with particulate antimony metal in a second reaction zone to form antimony trichloride, substantially free of antimony pentachloride, said second reaction zone maintained at a temperature at least sufficient to maintain the formed antimony trichloride in the liquid state;
    (c) separating the formed liquid antimony trichloride from the second reaction zone.

2. A process as claimed in claim 1 in which $n$ has a value of from about 1.7 to about 2.1.

3. A process as claimed in claim 1 in which the antimony trichloride is reacted with chlorine in the first reaction zone at a temperature of from about 73° C. to about 200° C.

4. A process as claimed in claim 1 in which the antimony trichloride is reacted with chlorine in the first reaction zone at a temperature of from about 73° C. to about 150° C.

5. A process as claimed in claim 1 in which the higher chlorides of antimony are reacted with particulate antimony metal in the second reaction zone at a temperature of from about 73° C. to about 200° C.

6. A process as claimed in claim 1 in which the higher chlorides of antimony are reacted with particulate antimony metal in the second reaction zone at a temperature of from about 73° C. to about 150° C.

7. A process as claimed in claim 3 in which the higher chlorides of antimony are reacted with particulate antimony metal in the second reaction zone at a temperature of from about 73° C. to about 200° C.

8. A process as claimed in claim 3 in which the higher chlorides of antimony are reacted with particulate antimony metal in the second reaction zone at a temperature of from about 73° C. to about 150° C.

9. A process as claimed in claim 4 in which the higher chlorides of antimony are reacted with particulate antimony metal in the second reaction zone at a temperature of from about 73° C. to about 200° C.

10. A process as claimed in claim 4 in which the higher chlorides of antimony are reacted with particulate antimony metal in the second reaction zone at a temperature of from about 73° C. to about 150° C.

11. A process for the production of high purity antimony trichloride from antimony metal which comprises:
   (a) reacting antimony trichloride with gaseous chlorine in the substantial absence of moisture in a liquid phase in a first reaction zone to form the higher chlorides of antimony having the empirical formula $SbCl_{(3+n)}$ wherein $n$ has a value of about 1.5 to about 2.2;
   (b) contacting the liquid, higher chlorides of antimony with particulate antimony metal in a second reaction zone to form antimony trichloride substantially free of antimony pentachloride, said second reaction zone maintained at a temperature at least sufficient to form antimony trichloride in the liquid state;
   (c) separating the formed antimony trichloride from the second reaction zone and recycling a portion of the separated liquid antimony trichloride to the first reaction zone for conversion to the higher chlorides of antimony.

12. A process for the production of high purity antimony trichloride from antimony metal which comprises:
   (a) reacting antimony trichloride with gaseous chlorine in the substantial absence of moisture in a liquid phase in a first reaction zone to form the higher chlorides of antimony having the empirical formula $SbCl_{(3+n)}$ wherein $n$ has a value of 1.7 to about 2.1;
   (b) contacting the liquid, higher chlorides of antimony with particulate antimony metal in a second reaction zone to form antimony trichloride substantially free of antimony pentachloride, said reaction zone maintained at a temperature at least sufficient to form antimony trichloride in the liquid state;
   (c) separating the formed antimony trichloride from the second reaction zone and recycling a portion of the separated liquid antimony trichloride to the first reaction zone for conversion to the higher chlorides of antimony.

References Cited

UNITED STATES PATENTS 2,062,450    12/1936    English _____ 260—273

FOREIGN PATENTS 614,276    12/1948    Great Britain.

EDWARD STERN, Primary Examiner

U.S. Cl. X.R.

423—491

PO-1050
(5/69)

UNITED STATES PATENT OFFICE
CERTIFICATE OF CORRECTION

Patent No. __3,787,557__ Dated __January 22, 1974__

Inventor(s) __ROBERT D. STEWART__

It is certified that error appears in the above-identified patent and that said Letters Patent are hereby corrected as shown below:

Column 3, line 44, "zones" should read -- zone --.

Column 4, line 54, "18" should read -- 28 --.

Column 5, line 19, "16" should read -- 26 --.

Signed and sealed this 17th day of September 1974.

(SEAL)
Attest:

McCOY M. GIBSON JR.
Attesting Officer

C. MARSHALL DANN
Commissioner of Patents